(12) United States Patent
Cserna et al.

(10) Patent No.: US 12,529,568 B2
(45) Date of Patent: Jan. 20, 2026

(54) RIDE EXPERIENCE ENHANCEMENTS WITH EXTERNAL SERVICES

(71) Applicant: Motional AD LLC, Boston, MA (US)

(72) Inventors: Bence Cserna, East Boston, MA (US); Alexander Brown, Dover, NH (US); Kevin C. Gall, Newmarket, NH (US)

(73) Assignee: Motional AD LLC, Boston, MA (US)

( * ) Notice: Subject to any disclaimer, the term of this patent is extended or adjusted under 35 U.S.C. 154(b) by 225 days.

(21) Appl. No.: 17/947,059

(22) Filed: Sep. 16, 2022

(65) Prior Publication Data

US 2024/0094012 A1 Mar. 21, 2024

(51) Int. Cl.
*G01C 21/34* (2006.01)
*G06Q 10/04* (2023.01)
*G06Q 50/40* (2024.01)

(52) U.S. Cl.
CPC ......... *G01C 21/3415* (2013.01); *G06Q 10/04* (2013.01); *G06Q 50/40* (2024.01)

(58) Field of Classification Search
CPC ..... G06Q 10/04; G06Q 50/40; G01C 21/3415
See application file for complete search history.

(56) References Cited

U.S. PATENT DOCUMENTS

| | | | |
|---|---|---|---|
| 9,769,616 B1 * | 9/2017 | Pao | H04W 4/023 |
| 10,126,138 B1 * | 11/2018 | Farmer | G06Q 50/40 |
| 10,233,021 B1 | 3/2019 | Brady et al. | |
| 10,679,312 B2 | 6/2020 | Matthiesen et al. | |
| 11,493,345 B1 | 11/2022 | Williams et al. | |
| 2018/0174332 A1 * | 6/2018 | Nie | G07F 17/0057 |
| 2019/0109910 A1 * | 4/2019 | Sweeney | H04W 48/18 |
| 2019/0208254 A1 * | 7/2019 | Raajan | H04N 21/2146 |
| 2020/0089257 A1 | 3/2020 | Gaither et al. | |
| 2020/0151631 A1 * | 5/2020 | Lamers | G08G 1/202 |
| 2020/0250772 A1 | 8/2020 | Höflich et al. | |

(Continued)

FOREIGN PATENT DOCUMENTS

| | | |
|---|---|---|
| EP | 3522082 | 8/2019 |
| JP | 2015-210726 | 11/2015 |

(Continued)

OTHER PUBLICATIONS

[No Author Listed], "Surface Vehicle Recommended Practice: Taxonomy and Definitions for Terms Related to Driving Automation Systems for On-Road Motor Vehicles," SAE International, Standard J3016, Sep. 30, 2016, 30 pages.

(Continued)

*Primary Examiner* — Andrea C Leggett
(74) *Attorney, Agent, or Firm* — Fish & Richardson P.C.

(57) ABSTRACT

Provided are methods for ride experience enhancements with external services, which can include receiving a request for transportation of a passenger to a service provider, and determining route information corresponding to the request. Some methods described also include providing service information associated with the service provider to the passenger, and receiving at least one requested service from the passenger based on the provided service information. Some methods described also include transmitting the at least one requested service and at least a portion of the route information to the service provider. Systems and computer program products are also provided.

20 Claims, 8 Drawing Sheets

(56) References Cited

U.S. PATENT DOCUMENTS

2020/0363220 A1* 11/2020 Simoudis ........... G06Q 30/0255
2024/0035830 A1 2/2024 Gall et al.

FOREIGN PATENT DOCUMENTS

| WO | WO 2020/055770 | 3/2020 |
|---|---|---|
| WO | WO 2022/072314 | 4/2022 |

OTHER PUBLICATIONS

International Search Report and Written Opinion in International Appln. No. PCT/US2023/029197, mailed on Nov. 14, 2023, 12 pages.

International Search Report and Written Opinion in the International Appln. No. PCT/US2023/032938, mailed on Dec. 19, 2023, 16 pages.

Sprankles, "Everything to Know About Uber Trip Experiences", Bustle, Jan. 13, 2016, retrieved from URL<https://www.bustle.com/articles/135305-what-is-uber-trip-experiences-get-the-rundown-on-this-new-feature-before-your-next-down-on-this-new-feature-before-your-next-ride>, retrieved on Dec. 4, 2023, 3 pages.

TechnologyReview.com [online], "Autonomous Vehicles: Are You Ready for the New Ride?" Nov. 9, 2017, retrieved on Apr. 28, 2022, retrieved from URL <https://www.technologyreview.com/2017/11/09/105139/autonomous-vehicles-are-you-ready-for-the-new-ride/>, 11 pages.

Weissbrot, "Car Service APis Are Everywhere, But What's in it for Partner Apps?", Ad Exchanger, Jul. 7, 2016, retrieved from URL<https://www.adexchanger.com/mobile/car-service-apis-everywhere-whats-partner-apps/>, retrieved on Dec. 4, 2023, 5 pages.

International Preliminary Report on Patentability in International Appln. No. PCT/US2023/032938, mailed on Mar. 27, 2025, 11 pages.

* cited by examiner

RIDE EXPERIENCE ENHANCEMENTS WITH EXTERNAL SERVICES

BACKGROUND

People engage ride hailing services that provide transportation from a first location to a second location. Businesses are often located at the locations. Accordingly, when a potential passenger requests transportation using a ride hailing service, the potential passenger can request transportation to the location of various businesses. The passenger arrives at the location of the business, and can obtain goods or services from the business.

DETAILED DESCRIPTION

Figure 1:
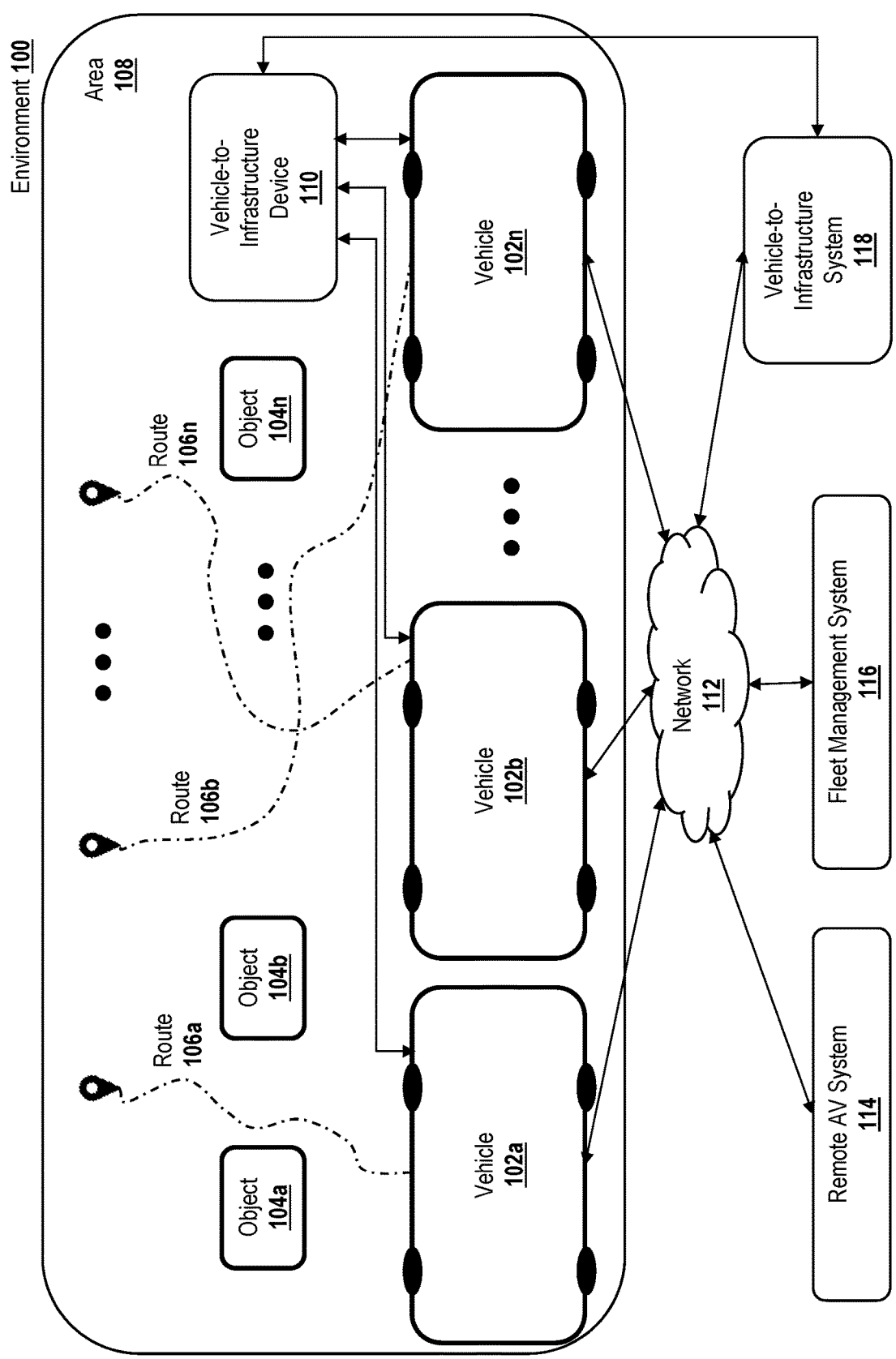
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement a vehicle (such as an autonomous vehicle) which enables transportation of a passenger from a source location (e.g., location for pick up the passenger) to a destination (e.g., the drop off location). A service provider is located at or near the destination. A request for transportation of a passenger to the service provider is received. Route information corresponding to the request is determined. The route information comprises an estimated arrival time at the service provider. Service information corresponding to services available at the service provider is presented on a user interface (e.g. vehicle displays, vehicle audio, user's device, etc.) after the passenger requests transportation from the source location to the destination. The passenger interacts with the service provider via the user interface, and the passenger requests a service from the service provider. The service provider initiates the requested service at the destination based on route information, and a time of service provision is coordinated with the estimated arrival time at the service provider.

By virtue of the implementation of systems, methods, and computer program products described herein, techniques for ride experience enhancements with external services provide advantages including a seamless integration of interactions between distinct service providers into a vehicle based service (e.g., a robotaxi service, on-demand mobility service). The techniques improve the provision of services by incorporating route information unavailable to passengers into the timing of service provisions. Additionally, the techniques improve the passenger experience with both the vehicle based service and at the service provider. The vehicle has knowledge of interactions between customers and distinct businesses. This enables the vehicle to automatically make a reservation, share the menu, and notify friends of the passenger without passenger input. The vehicle executes time-based integrated services based on the trip status. For example, the vehicle sends real-time updates to a restaurant about the estimated arrival time to enable ordered appetizers to be ready when the passenger arrives. In addition, the vehicle determines alternate services and service providers and redirects navigation to an alternate destination as requested by the passenger (e.g., the destination business has an unsatisfactory wait time for their service). For example, the vehicle ranks the most relevant services to the passenger, including paid services, and provides the ranked list to the passenger to choose an alternate service. The vehicle enables passenger interaction with the services of their choice, including a series of multiple services (e.g. movies followed by a restaurant followed by a haircut).

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
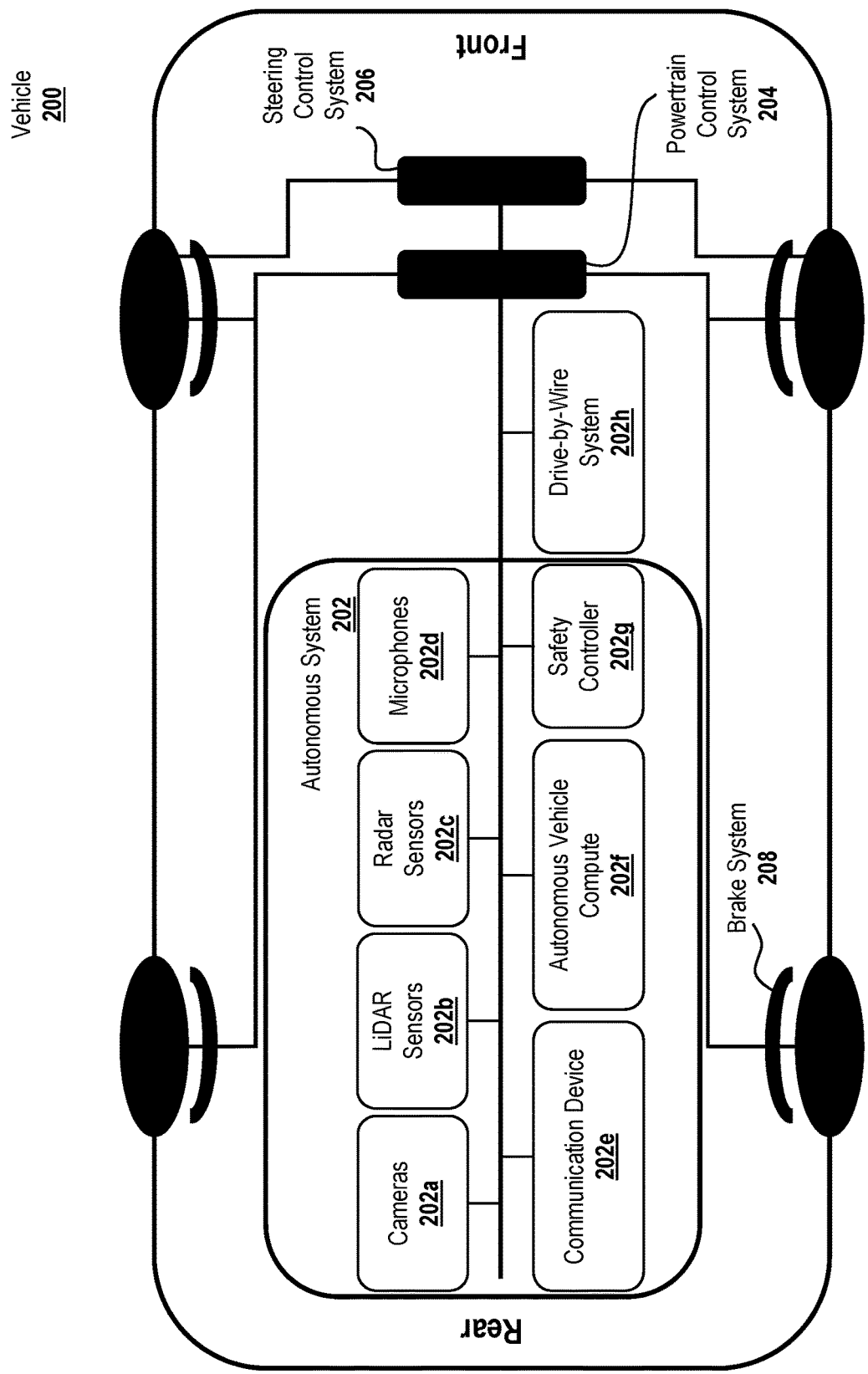
FIG. 2 is a diagram of one or more systems of a vehicle including an autonomous system.

Referring now to FIG. 2, vehicle 200 (which may be the same as, or similar to vehicles 102 of FIG. 1) includes or is associated with autonomous system 202, powertrain control system 204, steering control system 206, and brake system 208. In some embodiments, vehicle 200 is the same as or similar to vehicle 102 (see FIG. 1). In some embodiments, autonomous system 202 is configured to confer vehicle 200 autonomous driving capability (e.g., implement at least one driving automation or maneuver-based function, feature, device, and/or the like that enable vehicle 200 to be partially or fully operated without human intervention including, without limitation, fully autonomous vehicles (e.g., vehicles that forego reliance on human intervention such as Level 5 ADS-operated vehicles), highly autonomous vehicles (e.g., vehicles that forego reliance on human intervention in certain situations such as Level 4 ADS-operated vehicles), conditional autonomous vehicles (e.g., vehicles that forego reliance on human intervention in limited situations such as Level 3 ADS-operated vehicles) and/or the like. In one embodiment, autonomous system 202 includes operational or tactical functionality required to operate vehicle 200 in on-road traffic and perform part or all of Dynamic Driving Task (DDT) on a sustained basis. In another embodiment, autonomous system 202 includes an Advanced Driver Assistance System (ADAS) that includes driver support features. Autonomous system 202 supports various levels of driving automation, ranging from no driving automation (e.g., Level 0) to full driving automation (e.g., Level 5). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, drive-by-wire (DBW) system 202h, and safety controller 202g.

Figure 3:
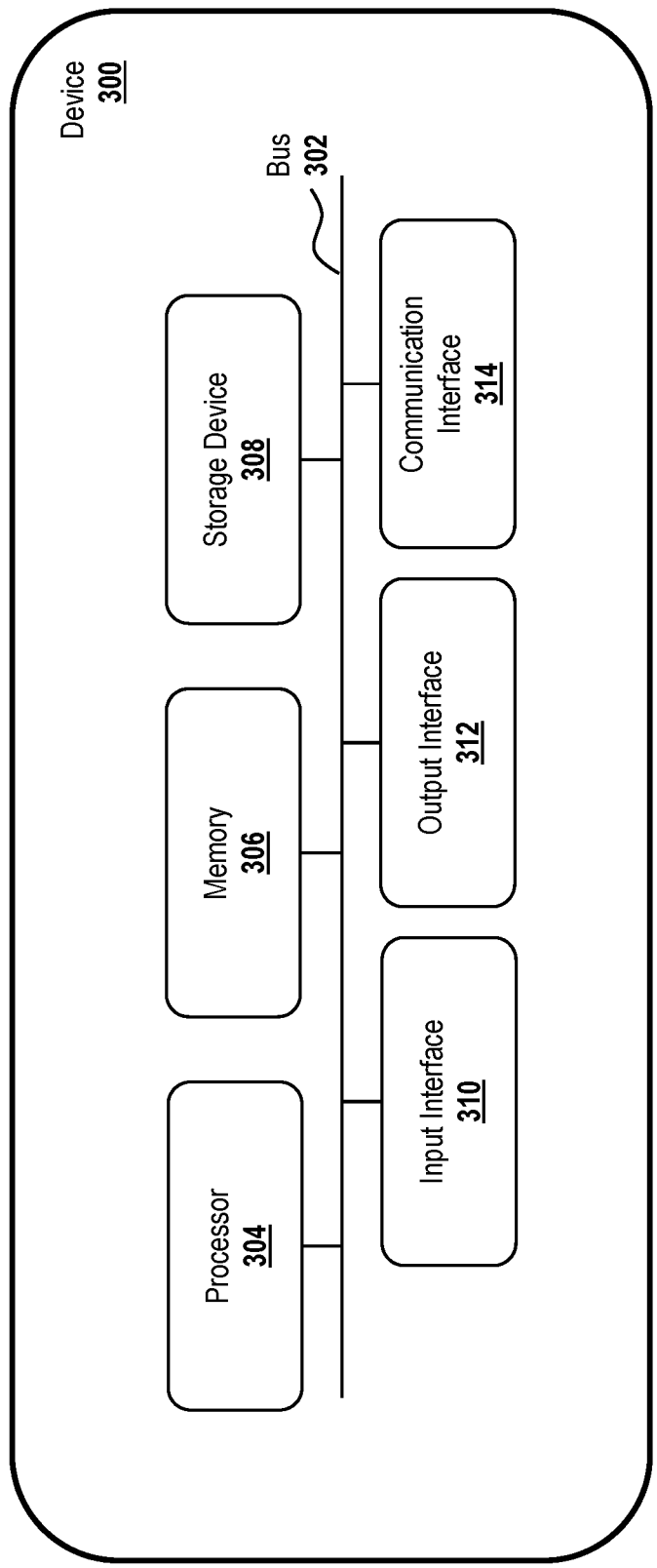
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a Charge-Coupled Device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD (Traffic Light Detection) data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Light Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e includes at least one device configured to be in communication with cameras 202a, LiDAR sensors 202b, radar sensors 202c, microphones 202d, autonomous vehicle compute 202f, safety controller 202g, and/or DBW (Drive-By-Wire) system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like), a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to make longitudinal vehicle motion, such as start moving forward, stop moving forward, start moving backward, stop moving backward, accelerate in a direction, decelerate in a direction or to make lateral vehicle motion such as performing a left turn, performing a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right. In other words, steering control system 206 causes activities necessary for the regulation of the y-axis component of vehicle motion.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like. Although brake system 208 is illustrated to be located in the near side of vehicle 200 in FIG. 2, brake system 208 may be located anywhere in vehicle 200.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one device of an autonomous vehicle system (e.g., an autonomous vehicle system that is the same as or similar to remote AV system 114 of FIG. 1, or autonomous vehicle compute 202*f* of FIG. 2), a fleet management system (e.g., a fleet management system that is the same as or similar to fleet management system 116 of FIG. 1), a V2I device (e.g., a V2I device that is the same as or similar to V2I device 110 of FIG. 1), a V2I system (e.g., a V2I system that is the same as or similar to V2I system 118 of FIG. 1), and/or one or more devices of network 112 (e.g., one or more devices of a system of network 112). In some embodiments, one or more devices of vehicles 102 (e.g., one or more devices of a system of vehicles 102), one or more devices of an autonomous vehicle system (e.g., an autonomous vehicle system that is the same as or similar to remote AV system 114 of FIG. 1, or autonomous vehicle compute 202*f* of FIG. 2), one or more devices of a fleet management system (e.g., a fleet management system that is the same as or similar to fleet management system 116 of FIG. 1), one or more devices of a V2I device (e.g., a V2I device that is the same as or similar to V2I device 110 of FIG. 1), one or more devices of a V2I system (e.g., a V2I system that is the same as or similar to V2I system 118 of FIG. 1), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
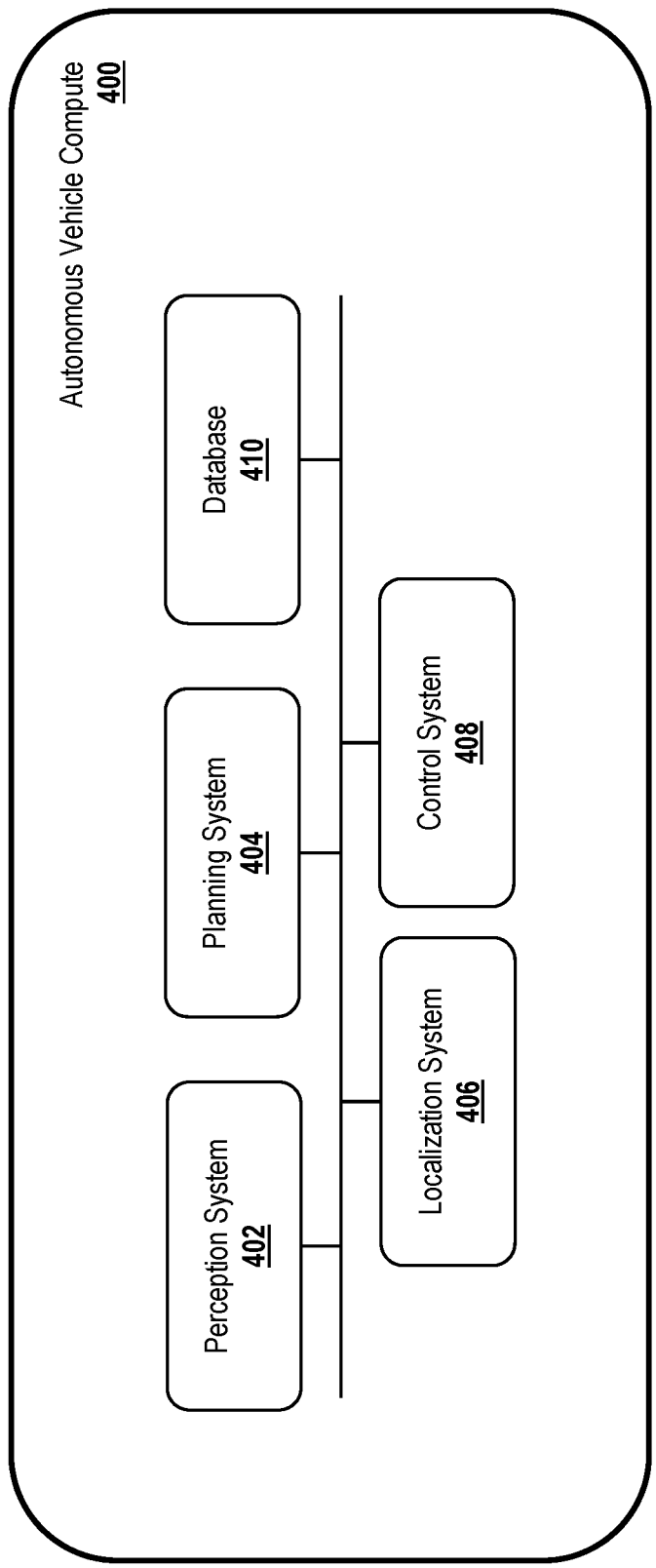
FIG. 4 is a diagram of certain components of an autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202*f* of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits (ASICs), Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202*a*), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In other words, planning system 404 may perform tactical function-related tasks that are required to operate vehicle 102 in on-road traffic. Tactical efforts involve maneuvering the vehicle in traffic during a trip, including but not limited to deciding whether and when to overtake another vehicle, change lanes, or selecting an appropriate speed, acceleration, deacceleration, etc. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202*b*). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202*h*, powertrain control system 204, and/or the like), a steering control system (e.g., steering control system 206), and/or a brake system (e.g., brake system 208) to operate. For example, control system 408 is configured to perform operational functions such as a lateral vehicle motion control or a longitudinal vehicle motion control. The lateral vehicle motion control causes activities necessary for the regulation of the y-axis component of vehicle motion. The longitudinal vehicle motion control causes activities necessary for the regulation of the x-axis component of vehicle motion. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202*b*) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 5:
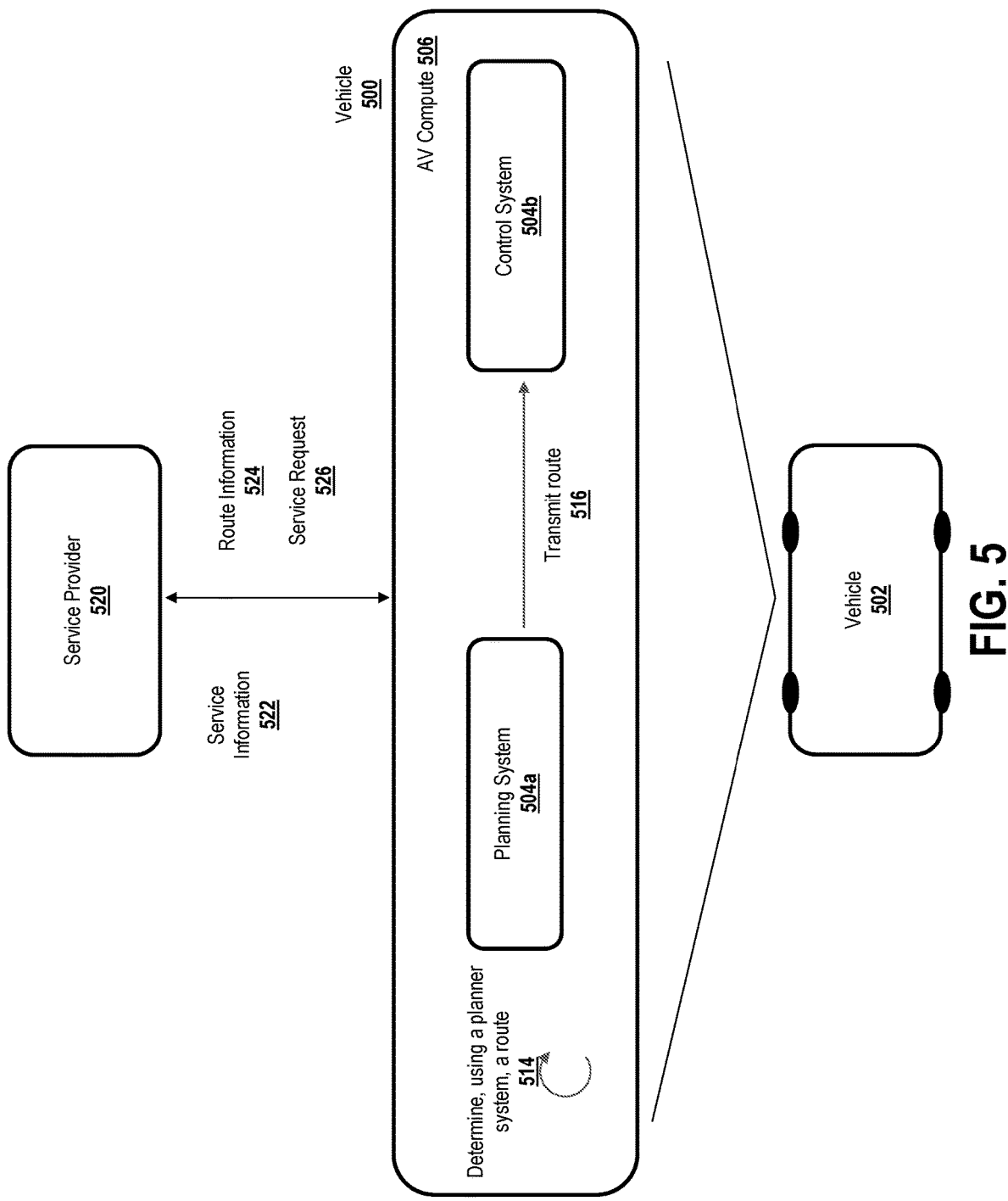
FIG. 5 is a diagram of an implementation of a process for ride experience enhancements with external services.

Referring now to FIG. 5, illustrated are diagrams of an implementation 500 of ride experience enhancements with external services. In some embodiments, implementation 500 includes vehicle 502, autonomous vehicle compute 506, planning system 504*a*, and control system 504*b*. In some embodiments, vehicle 502 is the same as or similar to vehicles 102 of FIG. 1. In some embodiments, the autonomous vehicle compute 506 is the same as or similar to autonomous vehicle compute 202*f* of FIG. 2, or autonomous vehicle compute 400 of FIG. 4. In some embodiments, planning system 504*a* is the same as or similar to planning system 404 of FIG. 4. In some embodiments, control system 504*b* is the same as or similar to control system 408 of FIG. 4 or the DBW system 202*h* of FIG. 2.

In the example of FIG. 5, the planning system 504*a* determines a route (514). The route is transmitted to the control system 504*b*. In some examples, control system 504*b* includes one or more controllers (e.g., electrical controllers, electromechanical controllers, and/or the like) configured to generate and/or transmit control signals to operate one or more devices of vehicle 502. The control system 504*b* controls the vehicle 502 along the determined route from an initial state to a final goal state.

In some embodiments, an autonomous vehicle compute 506 of the vehicle 502 receives a request for transportation of a passenger to a service provider 520. For example, the passenger generates a ride request that includes a first location (e.g., an initial state) and a destination (e.g., a goal state). In an example, the autonomous vehicle compute 506 identifies the service provider 520 according to the destination received from the passenger. In such an example, the destination includes a name of the service provider 520, and a destination location is derived from the name of the service provider 520. In examples, the destination received from the passenger is a destination location associated with (e.g., within a threshold distance of) the service provider 520. In some embodiments, the autonomous vehicle compute 506 receives the request for transportation through an on-demand mobility application (e.g., ride sharing application, ride hailing application, etc.) For example, the passenger downloads the application to a personal device, and the autonomous system receives the request for transportation from the application on the personal device as described with respect to FIG. 7.

In some embodiments, the autonomous vehicle compute 506 determines route information 524. The route information 524 is transmitted to the service provider 520. In some embodiments, the route information 524 is periodically transmitted to the service provider 520. The route information 524 includes, for example, information associated with transportation of at least one passenger to the service provider. For example, the route information includes routes 106 of FIG. 1. In some embodiments, a planning system (e.g., planning system 404 of FIG. 4) generates route information. In an example, the autonomous vehicle compute 506 generates route information based on the request for transportation to the service provider. In examples, the route information includes a current location of the AV, a pickup location of the passenger, a route between the current location of the AV and the passenger's pickup location, a destination location (e.g., the location of the service provider), routes to the destination location, or a combination of these. In some examples, the route information includes an estimated arrival time of the passenger at the service provider, actual delays when navigating on the route (e.g., present of past delays), predicted delays (e.g., anticipated delays), or a combination of these.

In some embodiments, the autonomous vehicle compute 506 receives service information 522 from the service provider 520. In some embodiments, the autonomous vehicle compute 506 transmits service request 526 to service provider 520. For example, the service request 526 includes a number of passengers in the vehicle 502. In some examples, the service information 522 includes a restaurant menu, and the service request 526 includes a food order from the menu.

In some embodiments, the autonomous vehicle compute 506 communicates with service providers using a communication protocol. In examples, the autonomous vehicle compute 506 obtains the communication protocol from a service database, such as the service database 706 of FIG. 7. In examples, the communication protocol is based on an application programming interface (API), such as third party APIs, service provider APIs, an AV API shared with service providers, or a combination of these. In examples, a service corresponding to the AV API is hosted by the autonomous vehicle compute 506, remote AV system 114, fleet management system 116, V2I system 118, or a combination of these. In some embodiments, the AV API service manages communication between the service providers and the autonomous vehicle compute 506. For example, fleet management includes a cloud service that manages communication between service providers and the AV. In examples, the communication protocol includes website crawlers, a telephone protocol, or a combination of these. A third party API or a service provider API includes standalone applications, and the autonomous vehicle compute 506 transmits communications (e.g., request service, create a reservation) to the service provider 520 through the API. In some examples, both the autonomous vehicle compute 506 and the service provider 520 may register with a third party API (e.g., standalone application for reservations, ridesharing, payment, or any combination of these). In some examples, the autonomous vehicle compute 506 may register with a service provider API. In some examples, the service provider 520 may register with the AV API. After registering with a shared API, for example, the autonomous vehicle compute 506 and service provider 520 communicate through the corresponding shared API. The integration of third party APIs enables service providers to participate in ride experience enhancements with minimal setup.

In some embodiments, the autonomous vehicle compute 506 communicates with the service provider 520 using a website of the service provider. For example, the autonomous vehicle compute 506 parses a service providers' websites for available services (e.g., menu), contact information, business hours, and online order forms. In some examples, the autonomous vehicle compute 506 requests services through the website of the service provider 520 as described in more detail below with respect to FIG. 6.

In some embodiments, the autonomous vehicle compute 506 communicates with the service provider 520 automatically by telephone. In some embodiments, the autonomous vehicle compute 506 uses a telephone communication protocol in response to determining that the service provider 520 cannot receive online communications (e.g., online service requests, online reservations). For example, the autonomous vehicle compute 506 begins the protocol by initiating a telephone call with the service provider 520. In such an example, the autonomous vehicle compute 506 determines at least one voice message (e.g., pre-recorded or machine generated in real-time) to request a service (e.g., reservation). The at least one voice message can include standard language and service specific language. Examples of voice messages are provided below in the context of the communications described with respect to FIGS. 6-8. In some embodiments, the autonomous vehicle compute 506 transmits the at least one voice message during the phone call. In some embodiments, the autonomous vehicle compute 506 requests a service using a call center. For example, the autonomous vehicle compute 506 provides the call center with the destination, estimated arrival time, number of passengers, and requested services, and instructs the call center to request the specified services (e.g., create a reservation, order food).

Figure 6:
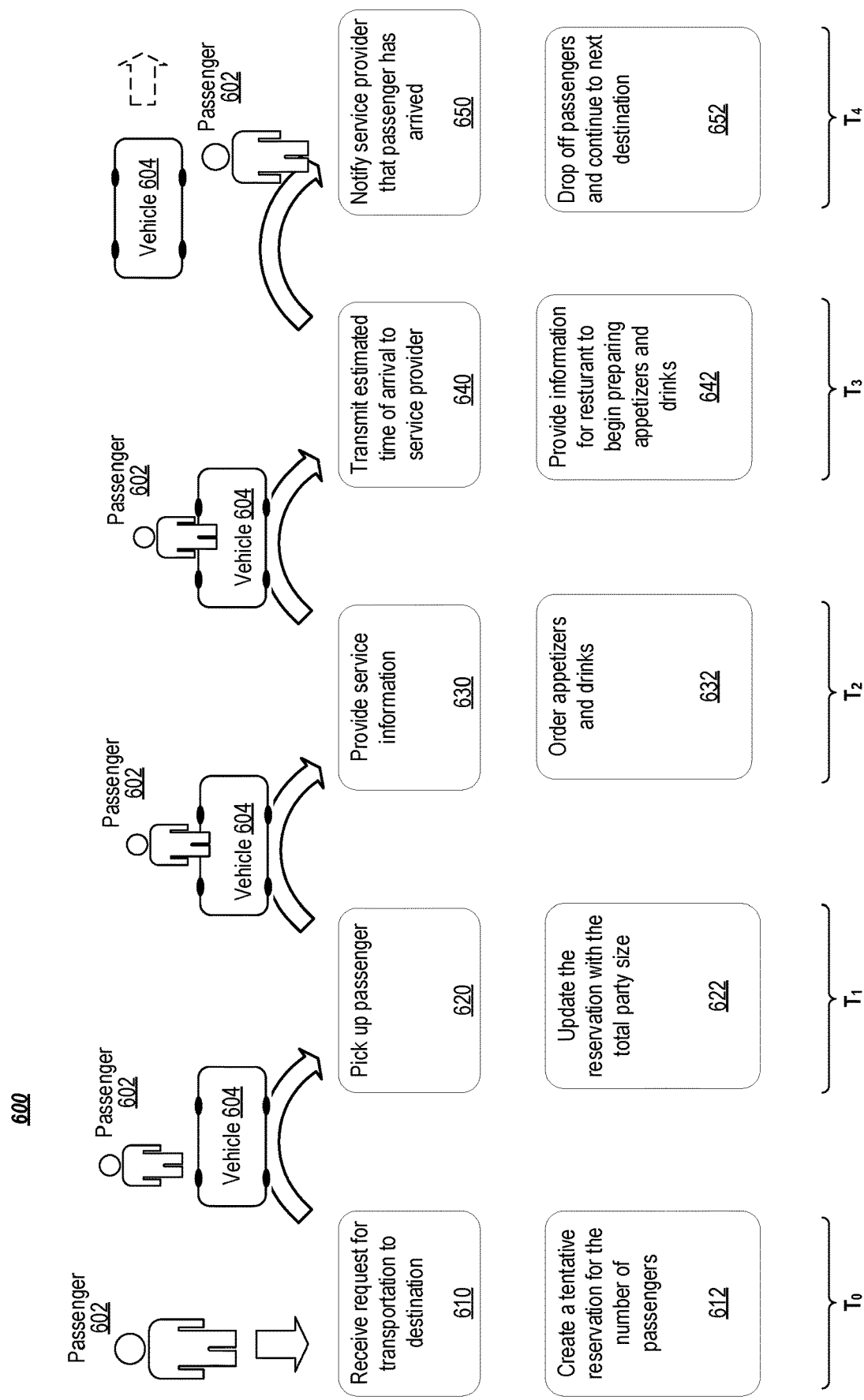
FIG. 6 is a diagram of an example process for ride experience enhancements with external services.

FIG. 6 is an example flow diagram of a process 600 of ride experience enhancements with external services. In some embodiments, process 600 is implemented (e.g., completely, partially, etc.) using a planning system that is the same as or similar to planning system 404, described in reference to FIG. 4, or planning system 504a, described in reference to FIG. 5. In some embodiments, one or more of the steps of process 600 are performed (e.g., completely, partially, and/or the like) by another device or system, or another group of devices and/or systems that are separate from, or include, the planning system. For example, one or more steps of process 600 can be performed (e.g., completely, partially, and/or the like) by remote AV system 114, vehicle 200 (e.g., autonomous system 202 of vehicle 200), and/or AV compute 506 (e.g., one or more systems of AV compute 506). In some embodiments, the steps of process 600 may be performed between any of the above-noted systems in cooperation with one another.

In FIG. 6, the environment 600 is described with reference to five stages $T_0$-$T_4$. The stages $T_0$-$T_4$ can occur in any appropriate order, though they are described in sequential order starting with $T_0$ and ending with $T_4$. In some examples, one or more of the stages occur substantially concurrently. In such an example, stage $T_2$ occurs substantially concurrently with stage $T_3$. In some examples, one or more of the stages trigger later stages. For example, stage $T_0$ triggers stage $T_1$, stage $T_1$ triggers stage $T_2$, and stage $T_2$ triggers $T_3$.

At $T_0$, the autonomous system (e.g., autonomous system 202) of vehicle 604 (e.g., autonomous vehicle 102 of FIG. 1, vehicle 200 of FIG. 2, vehicle 502 of FIG. 5) receives a request from a passenger 602 for transportation to a destination (610) of a service provider (e.g., service provider 520 of FIG. 5). In examples, the service provider is a partner as described with respect to FIG. 7. The service provider is communicatively coupled with at least one vehicle 604. In examples, the service provider is communicatively coupled with one or more vehicles through an on-demand mobility application. Additionally, in examples, the service provider is a restaurant, and the autonomous system determines that the passenger wishes to dine at the restaurant. In such examples, the autonomous system provides the passenger with the option to make a reservation at the restaurant. In some embodiments, the autonomous system generates an initial service request (e.g., service request 526) based on the request for transportation, sensor data, or input from the passenger. For example, a service request is transmitted to the service provider including information in the request for transportation, such as the number of passengers. In examples, sensors (e.g., cameras 202a, LiDAR sensors 202b, radar sensors 202c, and microphones 202d of FIG. 2) capture sensor data and the autonomous system generates the service request from the sensor data. In an example, the autonomous system renders one or more prompts that request details (e.g., input) from the passenger to generate the service request. In the example of FIG. 6, the autonomous system determines the number of passengers included in the request for transportation (e.g., two passengers) via sensor data or from passenger input.

The autonomous system transmits the initial service request to the service provider. Based on the service request, the service provider creates a reservation for the number of passengers (612) received in the service request. In some embodiments, the autonomous system transmits the service request using a communication protocol corresponding to the service provider (e.g., the communication protocol used by autonomous vehicle compute 506 of FIG. 5). In some examples, the autonomous system creates the service request through an API corresponding to the service provider. In some examples, the autonomous system creates the service request using an online reservation form on the service provider's website. In some embodiments, the autonomous system creates the service request automatically by telephone. For example, the autonomous system creates at least one digital voice message that includes details of the service request. In examples, the at least one voice message includes template language for a type of service request (e.g., " . . . create tentative reservation for a party of") and language based on the request (e.g., number of passengers: "two", estimated arrival time: "15 minutes" or "7:00 pm").

In some embodiments, the autonomous system continuously (e.g., in real-time, every second, every 10 seconds, every minute) transmits route information (e.g., route information 524 of FIG. 5) to the service provider (e.g., destination location of the service provider). In some embodiments, the route information and service requests are iteratively updated throughout $T_1$-$T_4$. In some embodiments, the autonomous system transmits route information in response to a request received from the service provider. In some examples, the route information includes an estimated time of arrival (e.g., 10 minutes away from destination, 7:00 PM), a current location of the vehicle, a route status (e.g., the passenger will arrive early or late for the reservation) or a combination of these.

At $T_1$, the autonomous system determines that the passenger 602 was picked up by the vehicle 604 (620). The autonomous system determines that passenger 602 is within the cabin of the vehicle 604 (e.g., the passenger 602 has been picked up) using sensor data. In examples, one or more passengers are picked up in addition to passenger 602. In examples, the autonomous system determines that passenger 602 and the one or more additional passengers have been picked up according to information obtained from the passenger 602 and/or the one or more additional passengers.

In some embodiments, the autonomous system updates the initial service request with a total party size. For example, the autonomous system updates the service request using the communication protocol corresponding to the service provider. In such an example, the passenger updates the number of guests arriving to the restaurant (e.g., reserve table for 4). For example, passenger 604 and one additional passenger are picked up by the vehicle 604, and two party members may arrive at the service provider through different means. The autonomous system transmits an updated service request (e.g., party size, updated estimated arrival time) to the service provider. Based on the updated service request, the service provider updates the reservation with the total party size (622).

At $T_2$, the autonomous system provides the passenger with information on goods and/or services available at the destination (630) based on service information (e.g., service information 522 of FIG. 5) received from the service provider. In some examples, the service information is obtained from the service provider and stored for access by the autonomous system prior to receiving the request for transportation from the passenger. In response to the passenger selecting the service provider as a destination, the autonomous system presents the service information to the passenger. For example, the autonomous system provides service information including a description of services provided (e.g., a restaurant menu), a preview of services (e.g., a preview of a movie), a list or set of items available from the service provider, a list or set of activities available at the service provider, or any combinations thereof. In some embodiments, the autonomous system renders service information to the passenger on a user interface (e.g. user interface 708 of FIG. 7).

In some embodiments, the autonomous system communicatively couples the passenger with the service provider via real-time, two-way voice services. For example, the autonomous system enables a passenger to place a phone call to the service provider within the user interface (e.g., using the vehicle's audio system, from an on-demand mobility application). In some examples, the autonomous system provides the passenger with a phone number of the service provider so that the passenger may call the service provider using a third party (e.g., outside of the use of an on-demand mobility application) telephone functionality from a personal device.

In some embodiments, the autonomous system receives updated service requests from the passenger. For example, the autonomous system provides service information to the passenger, and the passenger requests a service. For example, the autonomous system receives a selection of at least one menu item (e.g., appetizers or drinks) on a custom interface provided to the passenger (e.g., through user interface 708 of FIG. 7). In such an example, the autonomous system generates a service request that includes the order of appetizers and drinks (632) to the service provider.

At $T_3$, the autonomous system transmits the estimated time of arrival to the service provider at the destination (640). For example, the estimated time of arrival is based on a state of route 106 of FIG. 1. In some embodiments, the autonomous system receives information from the service provider based on the transmitted route information. In examples, the autonomous system receives the amount of time it will take to have the requested service ready for the passenger. In examples, the autonomous system receives an indication of whether the requested service can be ready at/near the estimated time of arrival time. If the time to prepare the service exceeds the estimated time of arrival time, then the autonomous system presents alternative services (e.g., using service selector 704 of FIG. 7).

In some embodiments, the autonomous system provides information for a restaurant to begin preparing appetizers and drinks (642). For example, the autonomous system transmits data (e.g., initial service request, route information including an estimated time of arrival or current location) at $T_3$ so that the services (e.g., appetizers and drinks) are ready when the passenger arrives, but not too early that the integrity of the food degrades. In this manner, a time of service provision is coordinated with the estimated arrival time at the service provider.

At $T_4$, the autonomous system notifies the service provider (e.g., restaurant) that the passenger has arrived (650). The autonomous system drops off the passenger and continues to the next destination (e.g., relocate vehicle, pick up new passenger) (652). In some embodiments, the autonomous system terminates the user interface after arrival at destination. In some embodiments, the autonomous system sends a notification to an on-demand mobility application that the passenger is no longer in the vehicle. In some embodiments, the autonomous system closes any open channels of the communication protocol with the service provider corresponding to the dropped-off passenger after arrival at destination.

Figure 7:
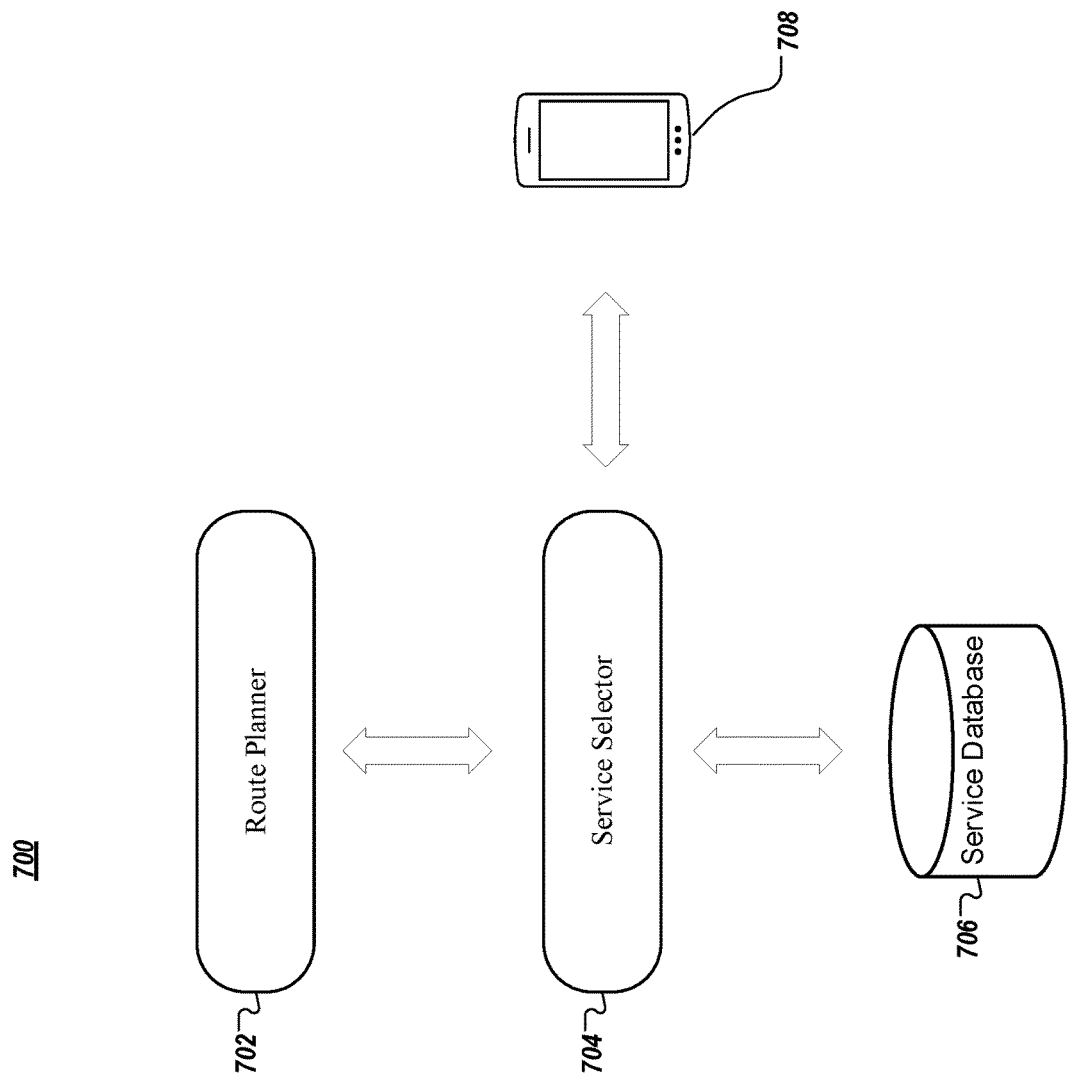
FIG. 7 is a diagram of an example environment in which the ride experience is enhanced with external services.

Referring now to FIG. 7, illustrated is example system 700 in which the ride experience is enhanced with external services. In some embodiments, the system 700 is implemented (e.g., completely, partially, etc.) using a vehicle that is the same as or similar to the vehicle 200 of FIG. 2. In some embodiments, the system 700 is implemented (e.g., completely, partially, etc.) using a device that is the same as or similar to the device 300 of FIG. 3. In some embodiments, the system 700 is implemented (e.g., completely, partially, etc.) using a system that is the same as or similar to the autonomous vehicle compute 400 of FIG. 4, or the autonomous vehicle compute 506 of FIG. 5. In some embodiments, system 700 includes route planner 702, service selector 704, database 706, and user interface 708.

In some embodiments, the route planner 702 is a planning system that is the same as or similar to planning system 404 of FIG. 4 or planning system 504a of FIG. 5. The route planner 702 determines a route (e.g., route 106 of FIG. 1) from a starting location to a destination (e.g., the location of the service provider). In some examples, the route planner 702 determines a route from the current location of vehicle to the location of the passenger, then to the location of the service provider.

In some embodiments, the service selector 704 determines at least one service provider for ride enhancements. For example, the service selector determines at least one service provider based on a request from the passenger. In such an example, the passenger requests transportation to the service provider. In some embodiments, the passenger requests transportation to a destination location, and the service selector 704 determines the at least one service provider based on the destination location. For example, the service selector 704 accesses service database 706 to determine the at least one service provider. In such example, the service selector 704 determines whether a location of the at least one service provider satisfies a threshold with respect to the requested destination location (e.g., the location of the at least one service provider is within a threshold distance to the requested destination location).

In some embodiments, the database 706 is located in vehicle 102, remote AV system 114, fleet management system 116, or distributed throughout a combination of these. In some embodiments, the database 706 is a database that is the same as or similar to database 410 of FIG. 4. In some embodiments, the database 706 stores profiles and service information associated with service providers, including services provided by respective service providers, information associated with location of the service providers, or any combination of these. For example, information associated with a service provider includes a physical address, website address, telephone number, hours of operation, supported communications protocols, preferred communication protocol, service provider specific voice prompts (e.g., automated voice messages received by the autonomous system when the service provider is called), or any combination of these. For example, a service provider uses an automated system to answer phone calls, and the service provider registers information (e.g., automated voice messages, voice responses, number responses) about the automated system with the autonomous system. In some examples, the service selector 704 transmits requests to the service provider in response to the specific voice prompts through telephone communications without the need to communicate with a real employee of the service provider.

In some embodiments, profiles for service providers are added to the database 706 when the service provider is visited by a passenger of the automated system. A service provider profile includes, for example, the type of service provider (e.g., restaurant, movie theater, salon, barber), service provider categories (e.g., family-friendly, accessible facility), other searchable businesses attributes, or a combination of these. In examples, the autonomous system provides service providers with the option to opt in or out of receiving service requests. In examples, the autonomous system prompts the added service provider to register as a partner service provider. In some embodiments, partners have the ability to register integration hooks. In some embodiments, partner service providers are distinguished from other service providers that are not registered with the autonomous system. In examples, registration with the autonomous system refers to the service provider providing information on services, location details, and other information for inclusion in the provision of external services. A partner service provider provides information associated with external services that is stored or packaged (e.g., in databased 706 of FIG. 7) for use by passengers to enable ride experience enhancements. In some embodiments, partner service providers are able to develop custom integration hooks to provide specific services (e.g., branded services) and/or options to passengers. In some embodiments, basic information (e.g., phone number) of non-partner service providers is displayed on a custom interface provided to the passenger (e.g., through user interface 708 of FIG. 7). Basic information refers to information extracted from publically available sources. In some embodiments, the basic information is automatically extracted from publically available sources and added to database that stores service provider information. For example, a web crawler is deployed to automatically extract service information associated with service providers.

In some embodiments, the database 706 stores integration hooks. A hook enables communication and integration across applications in response to a condition or event. In such an embodiment, the integration hooks are registered by the service providers. In such an embodiment, the integration hooks are associated with (e.g., indexed by) the service provider (e.g., partner service provider), location, and service type. In some embodiments, the autonomous system provides a set of lifecycle hooks as a Software Development Kit (SDK) that service providers may integrate with to provide services to the passenger. For example, services are directly integrated with the ride sharing experience (e.g., integrated with the vehicle, integrated with a ridesharing application).

In some embodiments, integration hooks are used to customize the passenger engagement experience. For example, to register integration hooks, the service providers define code (e.g., commands) to be executed by the autonomous system when a specific event is triggered. In some embodiments, the integration hooks instruct the autonomous system on the in-vehicle actions to be performed as requested by the service. For example, executing the code displays information on a custom interface provided to the passenger (e.g., through user interface 708 of FIG. 7). In some embodiments, the autonomous system communicates with multiple service providers to provide services during a single ride to a destination. In such embodiments, integration hooks for the multiple service providers are triggered in response to the events defined for the integration hooks.

In some embodiments, the integration hooks instruct the autonomous system on the service provider functions to invoke at different stages of the ride. In some examples, the integration hooks (e.g., registered integrations) are triggered based on (e.g., in response to) a passenger action. In such an example, the passenger action includes a request for transportation, a beginning of transportation to the service provider, a request for communication with the service provider, a requested service, canceling the transportation, or a combination of these. In some examples, the integration hooks are triggered based on (e.g., in response to) the vehicle satisfying a threshold. In such an example, an integration hook is triggered when an estimated time of arrival at the service provider is under a threshold (e.g., 10 minutes, 15 minutes). In some examples, an integration hook is triggered when the vehicle is within a threshold distance of the service provider (e.g., 1 mile, 5 miles).

In some embodiments, the integration hooks include an estimated time to prepare services. For example, the autonomous system transmits a service request (e.g., a notification to begin preparing a requested service) in response to determining that a remaining duration of the route (e.g., estimated time of arrival minus current time) satisfies a threshold (e.g., the estimated time to prepare the requested service is greater than the remaining duration of the route). In some examples, the integration hooks include a request for the autonomous system to notify a restaurant when to start the appetizers in response to a request from the passengers and the estimated time of arrival satisfying a threshold. In such an example, the autonomous system notifies the restaurant to start appetizers that take 10 min to make when the estimated time of arrival is under 10 minutes. In some examples, the autonomous system pre-orders snacks in response to the estimated time of arrival occurring after the start time for a show the passenger purchased tickets for. In some examples, the autonomous system provides previews for exhibits at a museum in response to the passenger requesting transportation to the museum. In some examples, the autonomous system makes reservations (e.g., tour, presentation) for time slots based on (e.g., after) the estimated time of arrival. In such an example, the reservations are updated in response to a delay during the transportation.

In some embodiments, the autonomous system provides service information to the passenger in response to an integration hook trigger. For example, a restaurant menu with options to place appetizer orders (e.g., stored in database 706) is provided to the passenger in response to a request for transportation to a restaurant service provider. In such an example, when the customer selects an appetizer, the service provider's integration hook is informed of the user's choice, allowing the integration hook to handle the request as defined by the service provider (e.g. by reaching out to a third party server to place the order at the restaurant).

In some embodiments, the service selector 704 provides the passenger with service information (e.g., service information 522 of FIG. 5) associated with the at least one service provider. In examples, the service selector accesses service database 706 to determine the service information. In some embodiments, the service selector 704 provides the passenger with service information through user interface 708. In some embodiments, user interface 708 is the same or similar to input interface 310 of FIG. 3.

In some embodiments, the user interface 708 includes at least one vehicle display, a vehicle audio system, a user's device, or a combination of these. For example, the user interface 708 includes the user interface used by the autonomous system to provide service information to the passenger at $T_2$ of FIG. 6. In examples, audio messages are played to the passenger through a sound system of the vehicle or through speakers of the user device. In some examples, a representation of the service information (e.g., text, images, or graphics) is displayed on vehicle displays (e.g., dashboard display, display on the back of a headrest) or the user device (e.g., within an on-demand mobility application on a smart phone).

In some embodiments, the autonomous system renders service information that is parsed from a website of the service provider. For example, the autonomous system renders the website of the service provider. In some embodiments, the autonomous system renders service information parsed from the website using a custom interface. In examples, the parsed information includes a restaurant menu, and the custom interface includes elements to order an item from the menu. In some embodiments, the custom interface receives a user input indicating a requested service. In such an embodiment, captured data associated with the user input is sent to the service provider in an updated service request. In some examples, the custom interface includes a confirmation (e.g., checkout) screen including selected services and estimated costs. In such examples, the service request is transmitted to the service provider after the user confirms the order.

In some embodiments, the service selector 704 provides a recommendation for at least one service. For example, the service selector recommends at least one service from the service information associated with at least one service provider.

In some embodiments, the service selector 704 provides recommendations for at least one alternative service. For example, the service selector determines alternative services when (e.g., in response to determining that) services at the destination service provider are unsatisfactory. In some embodiments, the autonomous system provides recommendations in response to receiving a service update from the service provider (e.g., unavailability service, unsatisfactory wait time). In some embodiments, the service selector 704 provides recommendations for at least one alternative service from the same service provider. For example, the service selector recommends alternative services in response to determining that a requested service is unavailable at the destination service provider. In some embodiments, the service selector 704 provides recommendations for at least one alternative service provider to the passenger. For example, the autonomous system determines that a wait time at the service provider is unsatisfactory. In such an example, a nearby restaurant with a 15 minute wait time can be recommended when the destination restaurant has a 60 minute wait time. In some embodiments, alternative services are stored in service database 706.

In some embodiments, the service selector 704 provides alternative services based on (e.g., in response to) receiving an indication that a time to prepare a requested service exceeds the estimated time of arrival. In some embodiments, the service selector 704 requests similar services from alternative service providers and obtains an indication of when the requested service will be available for the passenger at the alternative service provider. In such an embodiment, the service selector 704 recommends alternative services that will be available by an estimated time of arrival at the alternative service provider.

In some embodiments, the service selector 704 ranks services. For example, the service selector provides a ranked list of a top number (e.g., 1, 3, 10) of services that are most relevant to the passenger (e.g., through user interface 708). In such an example, the autonomous system ranks the services based on information (e.g., using weighted metrics) associated with the service providers (e.g., stored in service database 706) and passenger preferences. In some examples, passenger preferences include dietary restrictions, food preferences, activity preferences, maximum acceptable wait time, maximum acceptable travel time or distance, travel and activity history of the passenger, service preferences, or a combination of these.

In some embodiments, the service selector 704 ranks services in response to integration hooks stored in the database 706. For example, an integration hook triggers when the passenger requests transportation to a destination location, a type of service, or a combination of these (e.g., seafood on $1^{st}$ street). In such an example, a list (e.g., ranked list) of services is provided for the passenger to choose from. For example, the list of services is displayed as a pop-up during the route on user interface 708. In some examples, the list of services is provided to the passenger as audio.

In some embodiments, the autonomous system determines the destination service provider from a list (e.g., ranked list) of service providers. For example, the autonomous system receives a destination location (e.g., street address, latitude and longitude, pin on a map, shared location) from the passenger. The autonomous system determines a list of service providers which satisfy a threshold proximity to the destination location. In some embodiments, the autonomous system ranks the service providers included in the list.

In some embodiments, the database 706 stores promoted content (e.g., paid services, advertisements) from registered partner service providers (i.e., partners). For example, the autonomous system provides an internal marketplace to partners. The internal marketplace includes competitive case integration hooks for service providers to purchase. For example, the competitive case integration hooks trigger based on location or service type. In some embodiments, the service selector provides the passenger with a list of services for a location (e.g., along a route, within a threshold distance of a destination) based on the internal marketplace. In such embodiments, the list of services includes a predetermined number of services from partners which bid the highest to be associated with the location. In some examples, the autonomous system receives payment before providing the list (e.g., when the partner bids) or after the list is provided to the passenger.

In some embodiments, the service selector 704 provides a list of at least one service provider to the passenger, and receives a selection of the desired service provider from the user. In some examples, the service selector 704 obtains information about the at least one service provider from service database 706. In some examples, the at least one service provider can include at least one partner business. In some embodiments, the list of at least one service is provided through the user interface 708.

In some embodiments, the autonomous system provides a ranked list of alternative service providers to the passenger when services at the destination service provider are unsatisfactory. For example, the autonomous system ranks alternative service providers based on passenger preferences and the route information. The autonomous system provides the ranked alternative service providers to the passenger, and receives a selection of an alternative service provider from the ranked alternative service providers. In some embodiments, the autonomous system updates the route information to transport the passenger to the alternative service provider (e.g., set the new service provider as a waypoint, ending destination, or a stop of at least one stops).

In some embodiments, the autonomous system recommends a chain of services (e.g., at least two services) to the passenger. For example, other services are recommended when the passenger leaves a first service provider. In such an example, the recommendation is provided on user interface 708. In some examples, a chain of services is recommended before the passenger arrives at a first service provider. In such an example, the autonomous system recommends a second service for when the first service is complete. In some examples, the autonomous system recommends at least a second and third service (e.g., movies→restaurant→haircut). In some embodiments, the autonomous system recommends a chain of services in response to an unsatisfactory wait time at a service provider. For example, the autonomous system recommends another service (e.g., activity) before diner. In some embodiments, the autonomous system recommends another service when the chain of services is approaching an end.

In some embodiments, database 706 stores service providers as a chain of services. In some examples, the autonomous system provides deals to service providers included in chains of services (e.g., the service providers are recommended together if a single bid wins). In some examples, the autonomous system provides deals to passengers for selecting a chain of services. In such an example, the deal (e.g., a coupon, a discount) can displayed to the passenger on user interface 708 along with a list of recommended services.

Figure 8:
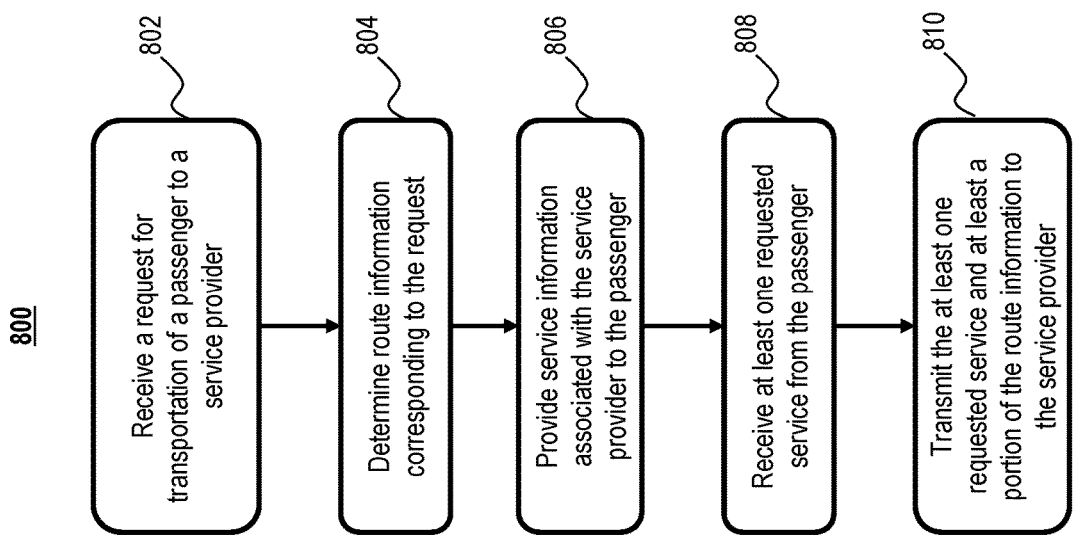
FIG. 8 is a flowchart of a process for ride experience enhancements with external services.

Referring now to FIG. 8, illustrated is a flowchart of a process 800 for ride experience enhancements with external services. In some embodiments, one or more of the steps described with respect to process 800 are performed (e.g., completely, partially, and/or the like) by autonomous system 200. Additionally, or alternatively, in some embodiments one or more steps described with respect to process 800 are performed (e.g., completely, partially, and/or the like) by another device or group of devices separate from or including autonomous system 200 such as device 300 of FIG. 3, and AV compute 400 of FIG. 4.

The autonomous system (e.g., autonomous system 202f of FIG. 2) receives a request for transportation of a passenger to a service provider (block 802). For example, the service request includes a name of the service provider or a location of the service provider. In some embodiments, the service provider is a partner with registered integrations. For example, the registered integrations are indexed by service provider location and at least one service type. In such an example, the registered integrations are stored in service database 706.

The autonomous system determines route information (e.g., route information 524 of FIG. 5) corresponding to the request (block 804). In some embodiments, the route information includes an estimated arrival time of the passenger at the service provider. For example, the route information includes a current location of the vehicle, a current location of the passenger, an estimated time of arrival, delays, passenger preferences, or any combination of these.

The autonomous system provides service information (e.g., service information 522 of FIG. 5) associated with the service provider to the passenger prior to the estimated arrival of the passenger at the service provider (block 804). For example, the service information is provided through user interface 708 of FIG. 7. In some examples, the service information includes a description of services provided, a preview of services, a restaurant menu, or a combination of these. In some examples, the service provider is a movie theater and the service information is at least one preview of a movie showing at the movie theater. In some embodiments, providing service information to the user includes transmitting the service information to the user device.

In some embodiments, the autonomous system provides the passenger with recommended services based on user preferences (e.g., service preferences, food allergies). For example, the autonomous system filters through a database (e.g., service database 706) for recommendations based on the location of the service provider and user preferences. In such an example, the recommendations include services provided by the destination service provider and services provided by other partners.

The autonomous system receives at least one requested service from the passenger based on the provided service information (block 808). For example, the at least one requested service includes a table reservation, an order of appetizers, movie tickets, or a combination of these.

The autonomous system transmits the at least one requested service (e.g., service request 526 of FIG. 5) and at least a portion of the route information to the service provider (block 810). In some embodiments, the autonomous system coordinates (e.g., different elements of a complex activity or organization enter into a relationship that will ensure efficiency or harmony) a provision time of the at least one requested service with the estimated arrival time of the passenger at the service provider. In some embodiments, the route information includes an estimated time of arrival. In some embodiments, the provision time includes a time that the services are ready for use or consumption by the passenger. For example, the autonomous system automatically coordinates with the destination service provider by making a reservation, and providing updates to the service provider with the route information. In this example, the autonomous system coordinates with a restaurant service provider to have appetizers ready when the passenger arrives, but not too early that the integrity of the food degrades.

In some embodiments, the autonomous system has knowledge of interactions between the passenger and distinct service providers, and coordinates between all parties relevant to passenger in a seamless integration. For example, if the autonomous system receives an unsatisfactory wait time for service from a service provider, the autonomous system automatically detects alternate services, and redirects the vehicle to an alternate service provider that has the service, makes a reservation with the alternate service provider, shares the menu with the passenger, and notifies the passenger's diner party.

In some embodiments, the autonomous system transmits the at least one requested service through a communication protocol (e.g., the communication protocol used at $T_0$ of FIG. 6). For example, the autonomous system transmits the at least one voice message during a phone call. In such an example, the autonomous system determines at least one voice message (e.g., pre-recorded or machine generated in real-time) to request the at least one requested service.

According to some non-limiting embodiments or examples, provided is a method comprising: receiving, with at least one processor, a request for transportation of a passenger to a service provider; determining, with the at least one processor, route information corresponding to the request, wherein the route information comprises an estimated arrival time of the passenger at the service provider; providing, with the at least one processor, service information associated with the service provider to the passenger prior to the estimated arrival time of the passenger at the service provider; receiving, with the at least one processor, at least one requested service from the passenger based on the provided service information; and transmitting, with the at least one processor, the at least one requested service and at least a portion of the route information to the service provider, wherein a provision time of the at least one requested service is coordinated with the estimated arrival time of the passenger at the service provider.

According to some non-limiting embodiments or examples, provided is a system comprising at least one processor, and at least one non-transitory storage media storing instructions that, when executed by the at least one processor, cause the at least one processor to: receive a request for transportation of a passenger to a service provider; determine route information corresponding to the request, wherein the route information comprises an estimated arrival time of the passenger at the service provider; provide service information associated with the service provider to the passenger prior to the estimated arrival time of the passenger at the service provider; receive at least one requested service from the passenger based on the provided service information; and transmit the at least one requested service and at least a portion of the route information to the service provider, wherein a provision time of the at least one requested service is coordinated with the estimated arrival time of the passenger at the service provider.

According to some non-limiting embodiments or examples, provided is at least one non-transitory storage media storing instructions that, when executed by at least one processor, cause the at least one processor to: receive a request for transportation of a passenger to a service provider; determine route information corresponding to the request, wherein the route information comprises an estimated arrival time of the passenger at the service provider; provide service information associated with the service provider to the passenger prior to the estimated arrival time of the passenger at the service provider; receive at least one requested service from the passenger based on the provided service information; and transmit the at least one requested service and at least a portion of the route information to the service provider, wherein a provision time of the at least one requested service is coordinated with the estimated arrival time of the passenger at the service provider.

Further non-limiting aspects or embodiments are set forth in the following numbered clauses:

Clause 1: A method comprising: receiving, with at least one processor, a request for transportation of a passenger to a service provider; determining, with the at least one processor, route information corresponding to the request, wherein the route information comprises an estimated arrival time of the passenger at the service provider; providing, with the at least one processor, service information associated with the service provider to the passenger prior to the estimated arrival time of the passenger at the service provider; receiving, with the at least one processor, at least one requested service from the passenger based on the provided service information; and transmitting, with the at least one processor, the at least one requested service and at least a portion of the route information to the service provider, wherein a provision time of the at least one requested service is coordinated with the estimated arrival time of the passenger at the service provider.

Clause 2: The method of clause 1, wherein transmitting the at least one requested service comprises: obtaining a communication protocol corresponding to the service provider; and transmitting the at least one requested service through the communication protocol.

Clause 3: The method of any of clauses 1 or 2, wherein transmitting the at least one requested service comprises: initiating a telephone call with the service provider; determining at least one voice message to request the at least one requested service; and transmitting the at least one voice message during the telephone call.

Clause 4: The method of any of clauses 1-3, further comprising: receiving a service update from the service provider; and in response to receiving the service update from the service provider, providing recommendations for at least one alternative service provider to the passenger.

Clause 5: The method of clause 4, wherein providing the recommendations for at least one alternative service provider to the passenger comprises: ranking alternative service providers based on passenger preferences and the route information; providing the ranked alternative service providers to the passenger; receiving a selection of an alternative service provider from the ranked alternative service providers; and updating the route information to transport the passenger to the alternative service provider.

Clause 6: The method of any of clauses 1-5, wherein transmitting at least a portion of the route information comprises transmitting real-time updates comprising a current location of the passenger and the estimated arrival time of the passenger.

Clause 7: The method of any of clauses 1-6, wherein receiving the request for transportation of the passenger to the service provider comprises: receiving a destination location from the passenger; determining a list of service providers which satisfy a threshold proximity to the destination location; and determining the service provider from the list of service providers.

Clause 8: The method of any of clauses 1-7, wherein the service provider is a restaurant, the service information is a menu of the restaurant, and the at least one requested service is a food order.

Clause 9: The method of any of clauses 1-8, wherein the service provider is a movie theater and the service information is at least one preview of a movie showing at the movie theater.

Clause 10: A system, comprising: at least one processor, and at least one non-transitory storage media storing instructions that, when executed by the at least one processor, cause the at least one processor to: receive a request for transportation of a passenger to a service provider; determine route information corresponding to the request, wherein the route information comprises an estimated arrival time of the passenger at the service provider; provide service information associated with the service provider to the passenger prior to the estimated arrival time of the passenger at the service provider; receive at least one requested service from the passenger based on the provided service information; and transmit the at least one requested service and at least a portion of the route information to the service provider, wherein a provision time of the at least one requested service is coordinated with the estimated arrival time of the passenger at the service provider.

Clause 11: The system of clause 10, wherein the instructions that cause the at least one processor to transmit the at least one requested service cause the at least one processor to: obtain a communication protocol corresponding to the service provider; and transmit the at least one requested service through the communication protocol.

Clause 12: The system of clauses 10 or 11, wherein the instructions that cause the at least one processor to transmit the at least one requested service cause the at least one processor to: initiate a telephone call with the service provider; determine at least one voice message to request the at least one requested service; and transmit the at least one voice message during the telephone call.

Clause 13: The system of any of clauses 10-12, wherein the instructions further cause the at least one processor to: receive a service update from the service provider; and in response to receiving the service update from the service provider, provide recommendations for at least one alternative service provider to the passenger.

Clause 14: The system of clause 13, wherein the instructions that cause the at least one processor to provide the recommendations for at least one alternative service provider to the passenger cause the at least one processor to: rank alternative service providers based on passenger preferences and the route information; provide the ranked alternative service providers to the passenger; receive a selection of an alternative service provider from the ranked alternative service providers; and update the route information to transport the passenger to the alternative service provider.

Clause 15: The system of any of clauses 10-14, wherein the instructions that cause the at least one processor to transmit at least a portion of the route information cause the at least one processor to transmit real-time updates comprising a current location of the passenger and the estimated arrival time of the passenger.

Clause 16: The system of clauses 10-15, wherein the instructions that cause the at least one processor to receive the request for transportation of the passenger to the service provider cause the at least one processor to: receive a destination location from the passenger; determine a list of service providers which satisfy a threshold proximity to the destination location; and determine the service provider from the list of service providers.

Clause 17: The system of clauses 10-16, wherein the service provider is a restaurant, the service information is a menu of the restaurant, and the at least one requested service is a food order.

Clause 18: The system of clauses 10-17, wherein the service provider is a movie theater and the service information is at least one preview of a movie showing at the movie theater.

Clause 19: At least one non-transitory storage media storing instructions that, when executed by at least one processor, cause the at least one processor to: receive a request for transportation of a passenger to a service provider; determine route information corresponding to the request, wherein the route information comprises an estimated arrival time of the passenger at the service provider; provide service information associated with the service provider to the passenger prior to the estimated arrival time of the passenger at the service provider; receive at least one requested service from the passenger based on the provided service information; and transmit the at least one requested service and at least a portion of the route information to the service provider, wherein a provision time of the at least one requested service is coordinated with the estimated arrival time of the passenger at the service provider.

Clause 20: The at least one non-transitory storage media of clause 19, wherein the instructions that cause the at least one processor to transmit the at least one requested service cause the at least one processor to: obtain a communication protocol corresponding to the service provider; and transmit the at least one requested service through the communication protocol.

Clause 21: The at least one non-transitory storage media of clauses 19 or 20, wherein the instructions that cause the at least one processor to transmit the at least one requested service cause the at least one processor to: initiate a telephone call with the service provider; determine at least one voice message to request the at least one requested service; and transmit the at least one voice message during the telephone call.

Clause 22: The at least one non-transitory storage media of any of clauses 19-21, wherein the instructions further cause the at least one processor to: receive a service update from the service provider; and in response to receiving the service update from the service provider, provide recommendations for at least one alternative service provider to the passenger.

Clause 23: The at least one non-transitory storage media of clause 22, wherein the instructions that cause the at least one processor to provide the recommendations for at least one alternative service provider to the passenger cause the at least one processor to: rank alternative service providers based on passenger preferences and the route information; provide the ranked alternative service providers to the passenger; receive a selection of an alternative service provider from the ranked alternative service providers; and update the route information to transport the passenger to the alternative service provider.

Clause 24: The at least one non-transitory storage media of any of clauses 19-23, wherein the instructions that cause the at least one processor to transmit at least a portion of the route information cause the at least one processor to transmit real-time updates comprising a current location of the passenger and the estimated arrival time of the passenger.

Clause 25: The at least one non-transitory storage media of clauses 19-24, wherein the instructions that cause the at least one processor to receive the request for transportation of the passenger to the service provider cause the at least one processor to: receive a destination location from the passenger; determine a list of service providers which satisfy a threshold proximity to the destination location; and determine the service provider from the list of service providers.

Clause 26: The at least one non-transitory storage media of clauses 19-25, wherein the service provider is a restaurant, the service information is a menu of the restaurant, and the at least one requested service is a food order.

Clause 27: The at least one non-transitory storage media of clauses 19-26, wherein the service provider is a movie theater and the service information is at least one preview of a movie showing at the movie theater.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method, comprising:
    receiving, with at least one processor, a request for transportation of a passenger to a service provider located at a destination;
    determining, with the at least one processor, route information corresponding to the request, wherein the route information comprises an estimated arrival time of the passenger at the service provider;
    providing, with the at least one processor, service information associated with the service provider to the passenger prior to the estimated arrival time of the passenger at the service provider;
    receiving, with the at least one processor, at least one requested service from the passenger based on the provided service information; and
    transmitting, with the at least one processor, the at least one requested service and at least a portion of the route information to the service provider, wherein a provision time of the at least one requested service at the destination by the service provider is coordinated with the estimated arrival time of the passenger at the service provider.

2. The method of claim 1, wherein transmitting the at least one requested service comprises:
    obtaining a communication protocol corresponding to the service provider; and
    transmitting the at least one requested service through the communication protocol.

3. The method of claim 1, wherein transmitting the at least one requested service comprises:
    initiating a telephone call with the service provider;
    determining at least one voice message to request the at least one requested service; and
    transmitting the at least one voice message during the telephone call.

4. The method of claim 1, the method further comprising:
    receiving a service update from the service provider; and
    in response to receiving the service update from the service provider, providing recommendations for at least one alternative service provider to the passenger.

5. The method of claim 4, wherein providing the recommendations for at least one alternative service provider to the passenger comprises:
    ranking alternative service providers based on passenger preferences and the route information;
    providing the ranked alternative service providers to the passenger;
    receiving a selection of an alternative service provider from the ranked alternative service providers; and
    updating the route information to transport the passenger to the alternative service provider.

6. The method of claim 1, wherein transmitting at least a portion of the route information comprises transmitting real-time updates comprising a current location of the passenger and the estimated arrival time of the passenger.

7. The method of claim 1, wherein receiving the request for transportation of the passenger to the service provider comprises:
    receiving the destination from the passenger;
    determining a list of service providers which satisfy a threshold proximity to the destination; and
    determining the service provider from the list of service providers.

8. The method of claim 1, wherein the service provider is a restaurant, the service information is a menu of the restaurant, and the at least one requested service is a food order.

9. The method of claim 1, wherein the service provider is a movie theater and the service information is at least one preview of a movie showing at the movie theater.

10. A system, comprising:
    at least one processor, and
    at least one non-transitory storage media storing instructions that, when executed by the at least one processor, cause the at least one processor to:

receive a request for transportation of a passenger to a service provider located at a destination;

determine route information corresponding to the request, wherein the route information comprises an estimated arrival time of the passenger at the service provider;

provide service information associated with the service provider to the passenger prior to the estimated arrival time of the passenger at the service provider;

receive at least one requested service from the passenger based on the provided service information; and transmit the at least one requested service and at least a portion of the route information to the service provider, wherein a provision time of the at least one requested service at the destination by the service provider is coordinated with the estimated arrival time of the passenger at the service provider.

11. The system of claim 10, wherein the instructions that cause the at least one processor to transmit the at least one requested service cause the at least one processor to:

obtain a communication protocol corresponding to the service provider; and transmit the at least one requested service through the communication protocol.

12. The system of claim 10, wherein the instructions further cause the at least one processor to:

receive a service update from the service provider; and in response to receiving the service update from the service provider, provide recommendations for at least one alternative service provider to the passenger.

13. The system of claim 12, wherein the instructions that cause the at least one processor to provide the recommendations for at least one alternative service provider to the passenger cause the at least one processor to:

rank alternative service providers based on passenger preferences and the route information;

provide the ranked alternative service providers to the passenger;

receive a selection of an alternative service provider from the ranked alternative service providers; and update the route information to transport the passenger to the alternative service provider.

14. The system of claim 10, wherein the instructions that cause the at least one processor to transmit at least a portion of the route information cause the at least one processor to transmit real-time updates comprising a current location of the passenger and the estimated arrival time of the passenger.

15. The system of claim 10, wherein the instructions that cause the at least one processor to receive the request for transportation of the passenger to the service provider cause the at least one processor to:

receive the destination from the passenger;

determine a list of service providers which satisfy a threshold proximity to the destination; and determine the service provider from the list of service providers.

16. At least one non-transitory storage media storing instructions that, when executed by at least one processor, cause the at least one processor to:

receive a request for transportation of a passenger to a service provider located at a destination;

determine route information corresponding to the request, wherein the route information comprises an estimated arrival time of the passenger at the service provider;

provide service information associated with the service provider to the passenger prior to the estimated arrival time of the passenger at the service provider;

receive at least one requested service from the passenger based on the provided service information; and transmit the at least one requested service and at least a portion of the route information to the service provider, wherein a provision time of the at least one requested service at the destination by the service provider is coordinated with the estimated arrival time of the passenger at the service provider.

17. The at least one non-transitory storage media of claim 16, wherein the instructions that cause the at least one processor to transmit the at least one requested service cause the at least one processor to:

obtain a communication protocol corresponding to the service provider; and transmit the at least one requested service through the communication protocol.

18. The at least one non-transitory storage media of claim 16, wherein the instructions further cause the at least one processor to:

receive a service update from the service provider; and in response to receiving the service update from the service provider, provide recommendations for at least one alternative service provider to the passenger.

19. The at least one non-transitory storage media of claim 18, wherein the instructions that cause the at least one processor to provide the recommendations for at least one alternative service provider to the passenger cause the at least one processor to:

rank alternative service providers based on passenger preferences and the route information;

provide the ranked alternative service providers to the passenger;

receive a selection of an alternative service provider from the ranked alternative service providers; and update the route information to transport the passenger to the alternative service provider.

20. The at least one non-transitory storage media of claim 16, wherein transmitting at least a portion of the route information comprises transmitting real-time updates comprising a current location of the passenger and the estimated arrival time of the passenger.

* * * * *